US012237121B2

(12) United States Patent
Ye et al.

(10) Patent No.: US 12,237,121 B2
(45) Date of Patent: Feb. 25, 2025

(54) WATERPROOF BUTTON STRUCTURE

(71) Applicants: Fasikl Incorporated, Dallas, TX (US); Hangzhou Fasikl Technology Co., Ltd, Hangzhou (CN)

(72) Inventors: Bing Ye, Hangzhou (CN); Baitong Wang, Hangzhou (CN)

(73) Assignees: Fasikl Incorporated, Dallas, TX (US); Hangzhou Fasikl Technology Co.,Ltd, Hangzhou (CN)

( * ) Notice: Subject to any disclaimer, the term of this patent is extended or adjusted under 35 U.S.C. 154(b) by 132 days.

(21) Appl. No.: 18/116,273

(22) Filed: Mar. 1, 2023

(65) Prior Publication Data

US 2023/0207232 A1 Jun. 29, 2023

(51) Int. Cl.
*H01H 13/06* (2006.01)
*H01H 13/14* (2006.01)

(52) U.S. Cl.
CPC ............ *H01H 13/06* (2013.01); *H01H 13/14* (2013.01)

(58) Field of Classification Search
CPC ........... H01H 13/06; H01H 13/14; H01H 3/12
USPC ........................................... 200/302.1, 302.2
See application file for complete search history.

(56) References Cited

U.S. PATENT DOCUMENTS

| | | | | |
|---|---|---|---|---|
| 9,859,072 | B2 * | 1/2018 | Rong | H01H 13/06 |
| 2010/0072046 | A1 | 3/2010 | Maeda et al. | |
| 2016/0233034 | A1 | 8/2016 | Sheng | |
| 2016/0365203 | A1 * | 12/2016 | Hidai | G05G 1/02 |
| 2018/0358190 | A1 * | 12/2018 | Lee | H04M 1/23 |
| 2021/0212230 | A1 | 7/2021 | Hsu et al. | |
| 2023/0266717 | A1 * | 8/2023 | Yang | G04G 17/04 361/679.01 |

* cited by examiner

*Primary Examiner* — Lheiren Mae A Caroc
(74) *Attorney, Agent, or Firm* — Hemisphere Law, PLLC; Zhigang Ma

(57) ABSTRACT

A waterproof button structure includes a button main body, a shell and a shaft sleeve, wherein a button mounting slot is reserved on the shell; a vertical column is arranged in the button mounting slot; the vertical column is provided with a through hole longitudinally penetrating through the vertical column; the button main body includes a pressing portion and a shaft portion; a bottom surface of the pressing portion is provided with a first annular groove; a second annular groove is formed between the vertical column and an inner wall of the button mounting slot.

4 Claims, 5 Drawing Sheets

WATERPROOF BUTTON STRUCTURE

TECHNICAL FIELD

The present disclosure relates to the technical field of waterproof buttons, specifically to a waterproof button structure.

BACKGROUND

At present, intelligent wearable devices are more and more valued and popular, are applied to more and more occasions, and have increasingly high requirements for waterproofing. The intelligent wearable devices are electronic devices, which are internally provided with circuit boards, batteries and other components. An intelligent wearable device is usually worn on the wrist. During use, a user will inevitably contact water. In order to reduce the harm of water to the intelligent wearable device, waterproofing measures need to be taken to protect the intelligent wearable device. A button main body is an indispensable part of the intelligent wearable device. Generally, the button main body extends into a shell, where water seepage is most likely to occur. Therefore, waterproofing the button main body becomes a major problem.

The button main bodies of most existing intelligent wearable devices are waterproofed with sealing ring structures and fixed with E-shaped circlip. In order to achieve effective waterproofing, at least two sealing rings are used, which are both assembled in an interference manner. As a result, large friction and poor pressing handfeel will be caused when the button main body is pressed. Triggering of the button main body will fail under a low pressure, so that it is necessary to improve the waterproof structure of the button main body. In the button main body, the E-shaped circlip is usually mounted at a tail end of the button main body. However, a special tool is required to mount the E-shaped circlip since the E-shaped circlip is small in size and requires a high pre-tightening force. Therefore, it is necessary to improve the mounting manner of the button main body.

SUMMARY

The present disclosure aims to provide a waterproof button structure, which has the advantages of easy mounting and efficient waterproofing and solves the problems in the background section.

In order to achieve the above objective, the present disclosure provides the following technical solution: A waterproof button structure includes a button main body, a shell and a shaft sleeve, wherein a button mounting slot is reserved on the shell; a vertical column is arranged in the button mounting slot; the vertical column is provided with a through hole longitudinally penetrating through the vertical column; the button main body includes a pressing portion and a shaft portion connected to a bottom surface of the pressing portion; the bottom surface of the pressing portion is provided with a first annular groove surrounding the shaft portion; a second annular groove is formed between the vertical column and an inner wall of the button mounting slot; a sealing ring groove is arranged on the shaft portion; the sealing ring groove is sleeved with a first sealing ring; the shaft portion is connected with the shaft sleeve after passing through the through hole; the first sealing ring resists against an inner wall of the through hole; a second sealing ring sleeves an outer circumferential side of the shaft sleeve; a third annular groove is formed in a bottom of the shell; the third annular groove surrounds a bottom of the through hole; the second scaling ring is provided with an annular bulge matched with the third annular groove; and the annular bulge is embedded into the third annular groove.

Preferably, a spring is arranged between the pressing portion and the button mounting slot; and two ends of the spring respectively resists against the first annular groove and the second annular groove.

Preferably, a plurality of trenches are uniformly arranged on the shaft portion; a plurality of bulges matched with the trenches are arranged on an inner wall of the shaft sleeve; and the plurality of bulges are embedded into and in interference fit with the plurality of trenches.

Preferably, an annular flange is arranged on the outer circumferential side of the shaft sleeve; and an annular groove matched with the annular flange is arranged in the second sealing ring.

Compared with the prior art, the present disclosure has the beneficial effects as follows:

1. In the present disclosure, by means of the arrangement of the first scaling ring and the second scaling ring, the first sealing ring is embedded in the sealing ring groove. Primary waterproofing is achieved by means of the interference fit with the through hole in the vertical column of the first sealing ring. The annular bulge on the second sealing ring is closely sealed with the third annular groove at the bottom of the shell under the action of the spring, thus achieving a secondary waterproof effect. The waterproofness of the button main body is improved.

2. In the present disclosure, by means of the arrangement of the sealing ring groove, it is convenient to sleeve the first sealing ring. By means of the arrangement of the annular flange and the annular groove of the second sealing ring, it is convenient to mount and connect the shaft sleeve with the second sealing ring. Since the shaft portion is provided by the plurality of trenches and the shaft sleeve is provided with the plurality of bulges, it is convenient to connect and mount the shaft sleeve with the shaft portion. No special tool is required for mounting, and the mounting convenience is improved.

DETAILED DESCRIPTION OF THE EMBODIMENTS

The technical solutions in the embodiments of the present disclosure will be described clearly and completely below with reference to the drawings in the embodiments of the present disclosure. Obviously, the embodiments described herein are only part of the embodiments of the present disclosure, not all the embodiments. Based on the embodiments in the present disclosure, all other embodiments obtained by those of ordinary skill in the art without creative work shall fall within the protection scope of the present disclosure.

Figure 1:
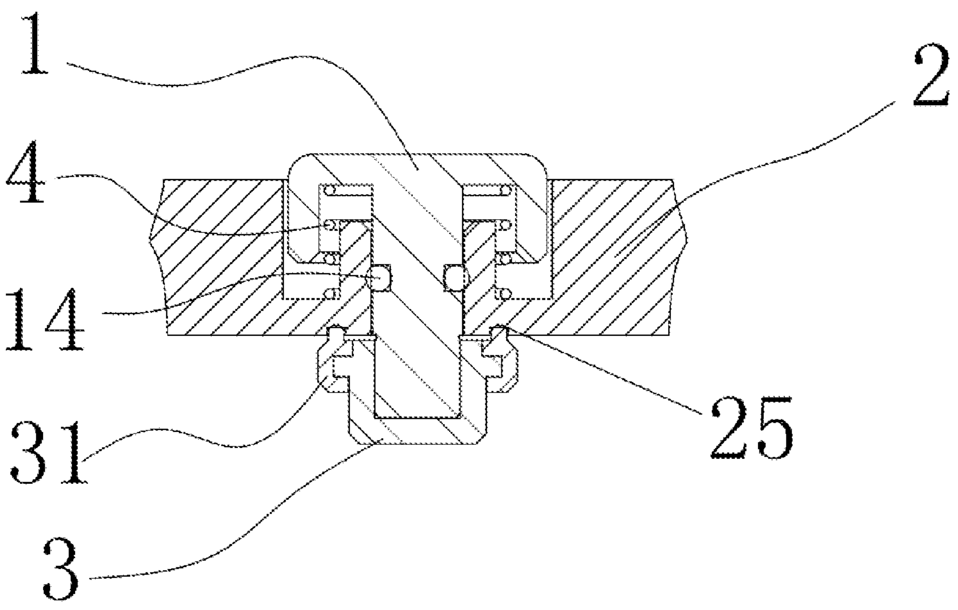
FIG. 1 is a sectional view of the present disclosure.
Figure 2:
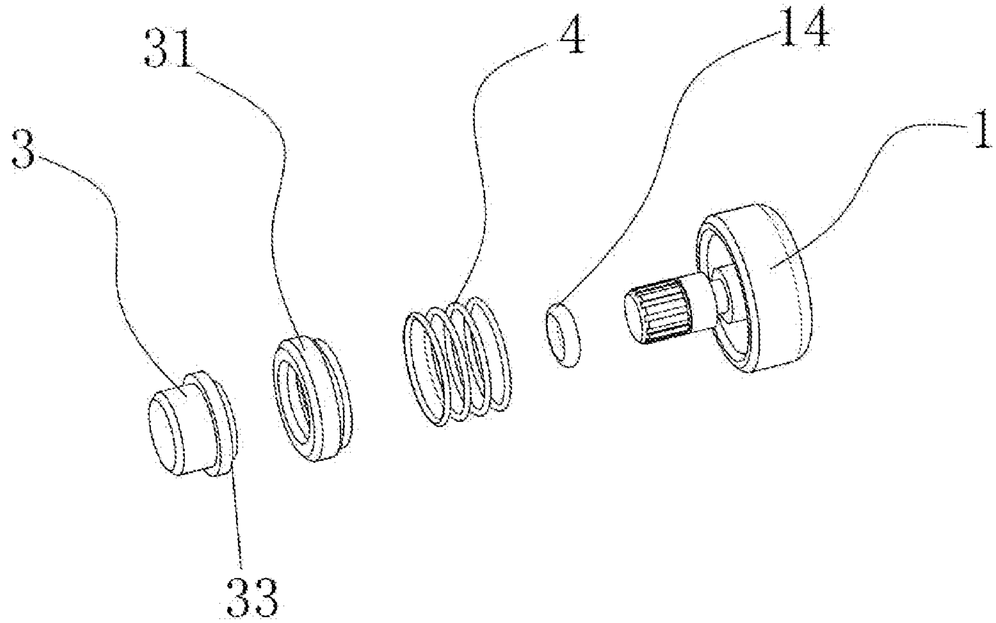
FIG. 2 is a partially exploded diagram of the present disclosure.
Figure 3:
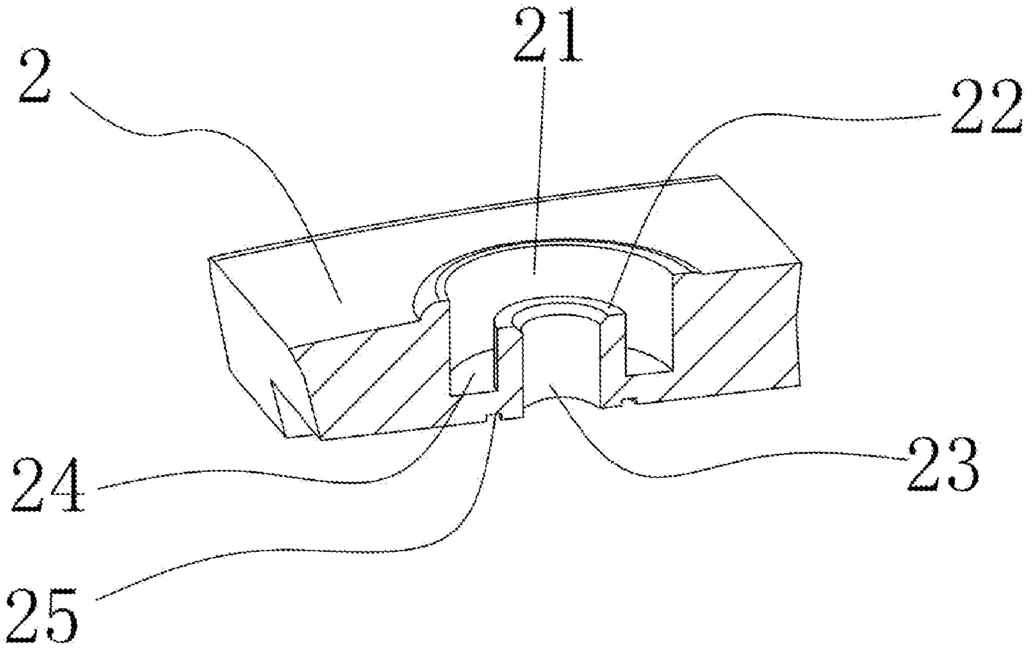
FIG. 3 is a sectional view of a shell of the present disclosure.
Figure 4:
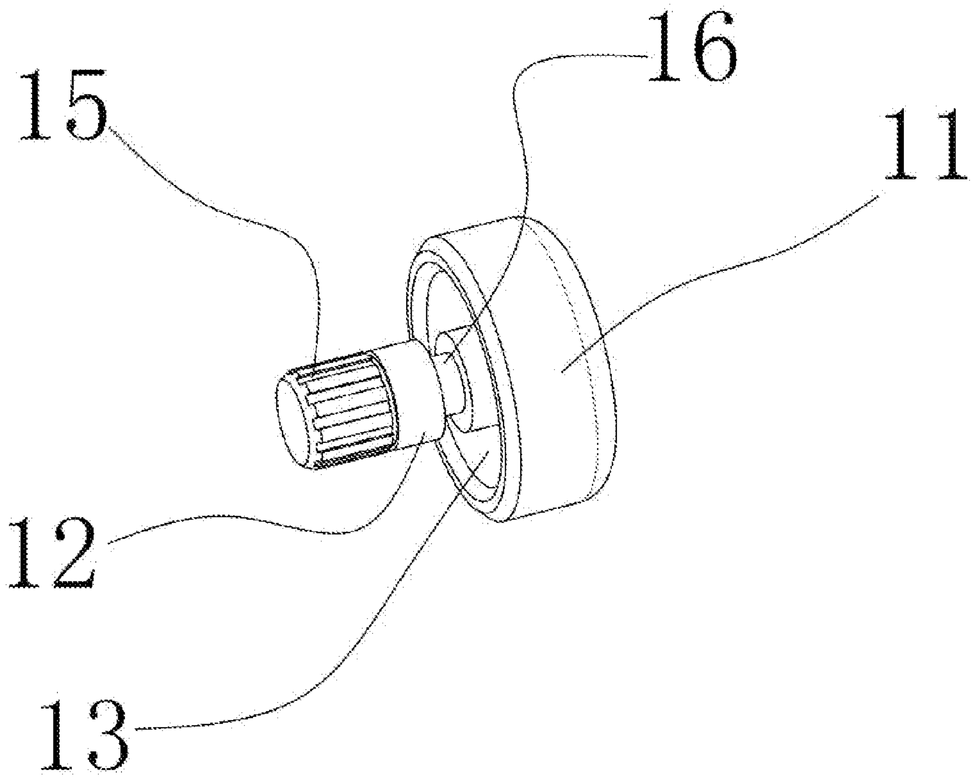
FIG. 4 is a schematic structural diagram of a button main body of the present disclosure.
Figure 5:
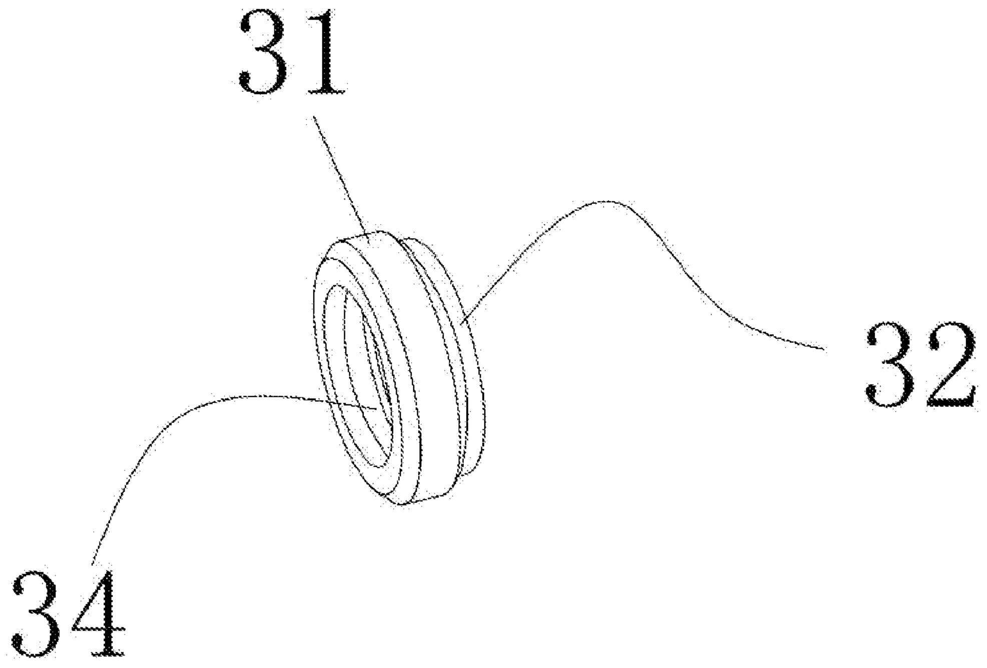
FIG. 5 is a schematic structural diagram of a second sealing ring of the present disclosure.

Referring to FIG. 1 to FIG. 5, the present disclosure provides one embodiment: A waterproof button structure includes a button main body 1, a shell 2 and a shaft sleeve 3. A button mounting slot 21 is reserved on the shell 2. A vertical column 22 is arranged in the button mounting slot 21. The vertical column 22 is provided with a through hole 23 longitudinally penetrating through the vertical column. The button main body 1 includes a pressing portion 11 and a shaft portion 12 connected to a bottom surface of the pressing portion 11. The bottom surface of the pressing portion 11 is provided with a first annular groove 13 surrounding the shaft portion 12. A second annular groove 24 is formed between the vertical column 22 and an inner wall of the button mounting slot 21. A scaling ring groove 16 is arranged on the shaft portion 12. The sealing ring groove 16 is sleeved with a first scaling ring 14. The shaft portion 12 is connected with the shaft sleeve 3 after passing through the through hole 23. The first sealing ring 14 resists against an inner wall of the through hole 23. A second scaling ring 31 sleeves an outer circumferential side of the shaft sleeve 3. A third annular groove 25 is formed in a bottom of the shell 2. The third annular groove 25 surrounds a bottom of the through hole 23. The second sealing ring 31 is provided with an annular bulge 32 matched with the third annular groove 25. The annular bulge 32 is embedded into the third annular groove 25.

The shape and size of the button mounting slot 21 are matched with the button main body 1. The pressing portion 11 is in clearance fit with the button mounting slot 21, so that water molecules flowing into the button are reduced. The first sealing ring 14 is in interference fit with the inner wall of the through hole 23, which achieves a waterproof effect.

Preferably, a spring 4 is arranged between the pressing portion 11 and the button mounting slot 21. Two ends of the spring 4 respectively resists against the first annular groove 13 and the second annular groove 24. The annular bulge 32 and the third annular groove 25 are closely scaled by an elastic force of the spring 4, which further enhances the waterproof effect.

Preferably, a plurality of trenches 15 are uniformly arranged on the shaft portion 12. A plurality of bulges (not shown) matched with the trenches 15 are arranged on an inner wall of the shaft sleeve 3. The plurality of bulges are embedded into and in interference fit with the plurality of trenches 15, so that the shaft portion 12 and the shaft sleeve 3 are fixedly connected with each other.

Preferably, an annular flange 33 is arranged on the outer circumferential side of the shaft sleeve 3. An annular groove 34 matched with the annular flange 33 is arranged in the second sealing ring 31. The annular flange 33 is embedded into the annular groove 34, which is convenient to connect and mount the second sealing ring 31 with the shaft sleeve 3.

For those skilled in the art, it is apparent that the present disclosure is not limited to the details of the demonstrative embodiments mentioned above, and that the present disclosure can be realized in other specific forms without departing from the spirit or basic features of the present disclosure. Therefore, from any point of view, the embodiments should be regarded as exemplary and non-limiting. The scope of the present disclosure is defined by the appended claims rather than the above description. Therefore, all changes falling within the meanings and scope of equivalent elements of the claims are intended to be included in the present disclosure. No drawing markings in claims shall be deemed to limit the claims involved.

What is claimed is:

1. A waterproof button structure, comprising a button main body, a shell and a shaft sleeve, wherein a button mounting slot is reserved on the shell; a vertical column is arranged in the button mounting slot; the vertical column is provided with a through hole longitudinally penetrating through the vertical column; the button main body comprises a pressing portion and a shaft portion connected to a bottom surface of the pressing portion; the bottom surface of the pressing portion is provided with a first annular groove surrounding the shaft portion; a second annular groove is formed between the vertical column and an inner wall of the button mounting slot; a sealing ring groove is arranged on the shaft portion; the sealing ring groove is sleeved with a first sealing ring; the shaft portion is connected with the shaft sleeve after passing through the through hole; the first sealing ring resists against an inner wall of the through hole; a second sealing ring sleeves an outer circumferential side of the shaft sleeve; a third annular groove is formed in a bottom of the shell; the third annular groove surrounds a bottom of the through hole; the second sealing ring is provided with an annular bulge matched with the third annular groove; and the annular bulge is embedded into the third annular groove.

2. The waterproof button structure according to claim 1, wherein a spring is arranged between the pressing portion and the button mounting slot; and two ends of the spring respectively resists against the first annular groove and the second annular groove.

3. The waterproof button structure according to claim 1, wherein a plurality of trenches are uniformly arranged on the shaft portion; a plurality of bulges matched with the trenches are arranged on an inner wall of the shaft sleeve; and the plurality of bulges are embedded into and in interference fit with the plurality of trenches.

4. The waterproof button structure according to claim 1, wherein an annular flange is arranged on the outer circumferential side of the shaft sleeve; and an annular groove matched with the annular flange is arranged in the second sealing ring.

* * * * *